United States Patent [19]
Yanagishita

[11] Patent Number: 4,976,414
[45] Date of Patent: * Dec. 11, 1990

[54] METHOD OF PRODUCING SKIN-COVERED FOAMED PLASTIC ARTICLE

[75] Inventor: Norio Yanagishita, Ayase, Japan

[73] Assignee: Ikeda Bussan Co., Ltd., Ayase, Japan

[ * ] Notice: The portion of the term of this patent subsequent to Sep. 25, 2007 has been disclaimed.

[21] Appl. No.: 260,420

[22] Filed: Oct. 20, 1988

[30] Foreign Application Priority Data

Oct. 31, 1987 [JP] Japan .................................. 62-276812

[51] Int. Cl.⁵ ............................................ B29C 67/22
[52] U.S. Cl. .................................. 264/40.3; 264/46.4; 264/46.6
[58] Field of Search ...................... 264/46.4, 46.6, 40.3

[56] References Cited

U.S. PATENT DOCUMENTS

| | | | |
|---|---|---|---|
| 3,852,389 | 12/1974 | Adler et al. ......................... | 264/46.4 |
| 3,929,948 | 12/1975 | Welch et al. ........................ | 264/46.7 |
| 3,989,781 | 11/1976 | Chant .................................. | 264/46.4 |
| 4,208,368 | 6/1980 | Egli ..................................... | 264/40.3 |
| 4,379,103 | 4/1983 | Doerfling ........................... | 264/45.5 |

FOREIGN PATENT DOCUMENTS

| | | | |
|---|---|---|---|
| 58-029633 | 2/1983 | Japan ................................... | 264/46.6 |
| 58-067426 | 4/1983 | Japan ................................... | 264/46.4 |
| 58-185235 | 10/1983 | Japan ................................... | 264/46.6 |
| 61-125816 | 6/1986 | Japan ................................... | 264/46.4 |

*Primary Examiner*—Sam Silverberg
*Assistant Examiner*—Allan R. Kuhns
*Attorney, Agent, or Firm*—Foley & Lardner, Schwartz, Jeffery, Schwaab, Mack, Blumenthal & Evans

[57] ABSTRACT

A method of producing a skin-covered foamed plastic article, which includes preparing a lower mold which has a cavity formed therein; putting a bag-shaped outer skin member into the cavity, the skin member having a porous inner layer; pouring a foamable material for the foamed plastic article into the bag-shaped outer skin member; and adjusting a pressure which is created in the cavity due to foaming of the foamable material.

4 Claims, 1 Drawing Sheet

METHOD OF PRODUCING SKIN-COVERED FOAMED PLASTIC ARTICLE

BACKGROUND OF THE INVENTION

1. Field of the Invention

The present invention relates in general to a method of producing a skin-covered foamed plastic article, and more particularly to a method of producing the article, which generally comprises the steps putting a bag-shaped outer skin member into a cavity of a mold, pouring a foamable liquid material into the skin member and curing the material.

2. Description of the Prior Art

Hitherto, in the field of seat manufacturing, a so-called "skin-covered foamed pad" has been widely used as a cushion member of a seat cushion and/or a seatback. Usually, the skin-covered foamed pad is produced by pouring a foamable liquid material into a bag-shaped outer skin member which has been held in a mold and thereafter curing the same in a suitable manner.

Among various outer skin members, there is a type which comprises an outer layer of fabric and an inner layer of foamed plastic sheet, such as laminated urethane foam or the like, lined on an inner surface of the outer layer. When, however, such type skin member is used for producing the skin-covered foamed plastic pad, it tends to occur that the product fails to have uniform hardness and/or flexibility throughout the outer skin thereof. This is because, upon application of the foamable material into the bag-shaped outer skin member of such type, the material penetrates into the inner layer but unevenly causing uneven impregnation of the material in the outer skin member therethroughout. In fact, the urethane foam laminate used has a considerable number of open cells permitting penetration of the liquid material thereinto.

SUMMARY OF THE INVENTION

It is therefore an object of the present invention to provide a method of producing a skin-covered foamed plastic article, which method is free of the above-mentioned drawback.

According to the present invention, there is provided a method of producing a skin-covered foamed plastic article, which method comprises by steps preparing a lower mold which has a cavity formed therein; putting a bag-shaped outer skin member into the cavity, the skin member having a material impregnable porous inner layer; pouring a foamable material for the foamed plastic article into the bag-shaped outer skin member; and adjusting a pressure which is created in the cavity due to foaming of the foamable material to control the thickness of the material impregnated part of the inner layer.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
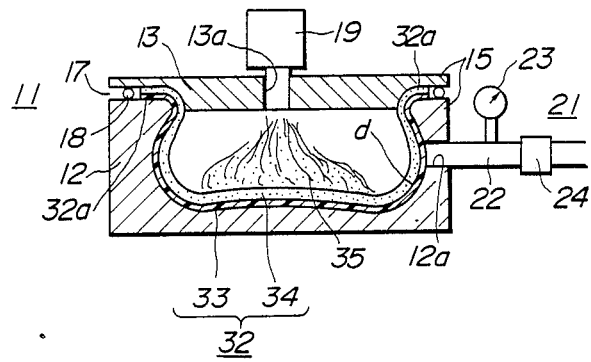
FIG. 1 is a sectional view of a mold assembly which is used in a method according to the present invention.

Referring to FIG. 1, there is shown a mold assembly 11 which is used in the method of the present invention. The mold assembly 11 comprises a lower mold 12 having a cavity "d" which is shaped to match with the contour of the pad to be produced, and an upper mold 13 which is to be put on the lower mold 12 in such a manner as shown. Although not shown in the drawing, if necessary, a suitable core mold may be used.

Denoted by numeral 17 is a skin member retaining portion which is defined by respective mating portions 15 of the lower and upper molds 12 and 13. That is, upon molding, the mating portions 15 put therebetween a peripheral edge portion 32a of an outer skin member 32 for retaining the same relative to the mold assembly 11. A packing 18 is seated on the mating portion of the lower mold 12 for achieving sealing between the mating portions 15. The upper mold 13 is formed with a bore 13a into which an pouring head 19 of foamable material feeder (not shown) is insertable from the outside.

The lower mold 12 is equipped with a pressure control device 21 in order to control a pressure within the cavity "d" of the mold 12. The pressure control device 21 comprises a pipe 22 exposed to the cavity "d" through a bore 12a formed in the lower mold 12, a pressure gauge 23 connected to the pipe 22 to measure the pressure in the cavity "d" and a pressure control valve 24 connected to the pipe 22. The pressure control valve 24 opens its passage when the pressure gauge 23 indicates that the pressure in the cavity "d" increases to a predetermined value.

In the following, the steps for producing a skin-covered foamed plastic pad will be described.

First, a bag-shaped outer skin member 32 is put into the cavity "d" of the lower mold 12 having the peripheral edge portion 32a thereof seated on the mating portion 15 of the lower mold 12, and then the upper mold 13 is put on the lower mold 12 in such a manner as is shown in FIG. 1. The outer skin member 32 is of the above-mentioned type, viz, the type which comprises an outer layer 33 of fabric or plastic and an inner layer 34 of foamed plastic sheet, such as laminated urethane foam or the like, lined on a back surface of the outer layer 33. Preferably, the inner layer 34 is of an urethane foam sheet having a thickness ranging from about 2 mm to about 20 mm.

Then, the pouring head 19 of the material feeder is mated with the bore 13a of the upper mold 13 and a foamable material for a foamed polyurethane is poured into the bag-shaped outer skin member 32. For the reason as has been mentioned hereinafore, part of the material penetrates into the porous inner layer 34 of the outer skin member 32. Thereafter, the material is cured in a known circumstance for a certain time.

During curing of the material, the pressure in the cavity "d", more specifically, the pressure in a clearance defined between the outer skin member 32 and a wall bounding the cavity "d" is gradually increased due to foaming of the material which takes place in the cavity "d".

Figure 2:
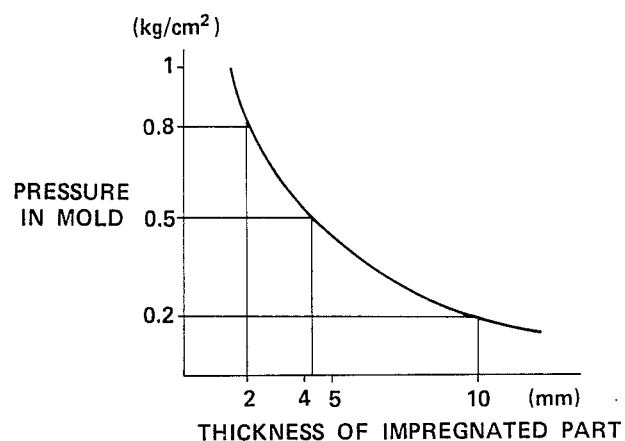
FIG. 2 is a graph showing a relationship between the pressure in the mold and the thickness of the material-impregnated part of the outer skin member.
Figure 3:
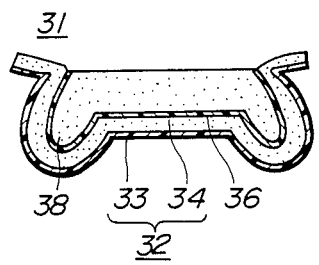
FIG. 3 is a sectional view of a skin-covered foamed plastic pad for a seat, which is produced in accordance with the present invention.

Experiment has revealed that the penetration of the material into the inner layer 34 is evenly achieved when the curing of the material is carried out under a certain pressure and also revealed that the thickness of the material-impregnated part 16 (see FIG. 3) of the inner layer 34 of the outer skin member 32 depends on the pressure created in the cavity "d". FIG. 2 shows a result of such experiment in a case of using an inner layer 34 of 15 mm in thickness.

In fact, when curing of the material was carried out under a pressure of about 0.5 kg/cm$^2$, the thickness of the material-impregnated part 36 of the inner layer 34 was about 4 mm, while, when the pressure was about 0.8 kg/cm$^2$, the thickness was about 2 mm. Furthermore, when the pressure was 0.2 kg/cm$^2$, the thickness was about 10 mm.

Thus, by adjusting the critical value of the pressure control valve 24 with reference to the relationship depicted by the graph of FIG. 2, it becomes possible to provide the inner layer 34 of the outer skin member 32 with a material-impregnated part 36 of a desired thickness therethroughout. This means that the hardness or flexibility of the outer skin member 32 of the product 31 (see FIG. 3) can be readily varied by only manipulating the pressure control valve 24.

Although the above description is directed to the steps wherein the pouring of the foamable material into the cavity (viz., the outer skin member) is carried out after the upper mold is put on the lower mold, the upper mold may be put on the lower mold after the material pouring is carried out.

I claim:

1. A method of producing a skin-covered foamed plastic article, comprising:

(a) preparing a lower mold which has a cavity formed therein;
    (b) putting a bag-shaped outer skin member into said cavity, said skin member having a porous inner layer;
    (c) sealingly closing said cavity;
    (d) pouring a foamable material for the foamed plastic article into the bag-shaped outer skin member, said material being capable of impregnating a portion of said inner layer, said material foaming in said cavity and causing pressure in said cavity to gradually increase;
    (e) curing said material to provide said article; and
    (f) activating pressure control means when said pressure increases to a predetermined value and thereby adjusting said pressure such that said curing is carried out under a certain pressure which will provide said inner layer with a material-impregnated part of a desired thickness therethroughout.

2. A method as claimed in claim 1, in which said inner layer is a foamed material.

3. A method as claimed in claim 2, in which said foamable material is a liquid material for foamed polyurethane.

4. A method as claimed in claim 2, in which said pressure control means is an enclosed clearance between an outer surface of said outer skin member and an inner wall of said cavity which communicates with the atmosphere when the pressure in said clearance increases to a given degree.

* * * * *